United States Patent [19]
Koebele

[11] Patent Number: 5,109,604
[45] Date of Patent: May 5, 1992

[54] METHOD OF ASSEMBLING A TORQUE CONVERTER IMPELLER

[75] Inventor: Ralph R. Koebele, Mt. Clemens, Mich.

[73] Assignee: Borg-Warner Automotive Transmission & Engine Components Corporation, Sterling Heights, Mich.

[21] Appl. No.: 341,355

[22] Filed: Apr. 20, 1989

[51] Int. Cl.⁵ .............................................. F16D 33/00
[52] U.S. Cl. ................................ 29/889.5; 29/889.21; 416/180
[58] Field of Search ............................ 416/180, 197 C; 29/889.5, 889.21, 464, 467, 513

[56] References Cited

U.S. PATENT DOCUMENTS

| | | | |
|---|---|---|---|
| 2,256,988 | 9/1941 | Michailoff | 29/889.5 |
| 2,717,673 | 9/1955 | Zeidler | |
| 2,779,292 | 1/1957 | Zeidler | 29/889.5 |
| 2,855,852 | 10/1958 | Gamble | |
| 3,137,915 | 6/1964 | Smirl | 29/889.5 |
| 3,545,883 | 12/1990 | Iijima | 416/197 |
| 3,550,234 | 12/1970 | Herold | 29/889.5 |
| 3,681,837 | 8/1972 | Franklin | 29/889.5 |
| 4,059,365 | 11/1977 | Ivey et al. | 416/174 |
| 4,450,611 | 5/1984 | Ito et al. | 29/889.5 |
| 4,584,835 | 4/1986 | Nishi | 29/889.5 |

FOREIGN PATENT DOCUMENTS

| | | | |
|---|---|---|---|
| 0019863 | 2/1977 | Japan | 29/889.5 |
| 0696477 | 9/1953 | United Kingdom | 29/889.5 |

Primary Examiner—Irene Cuda
Attorney, Agent, or Firm—Emch, Schaffer, Schaub et al.

[57] ABSTRACT

A method for assembling a torque converter impeller includes securing a plurality of vanes to a core ring to maintain the vanes in a desired orientation. The core ring and vanes are positioned as a unit in an outer shell where the outer shell has a substantially smooth interior surface. The vanes and core ring unit is secured to the interior surface of the outer shell.

21 Claims, 5 Drawing Sheets

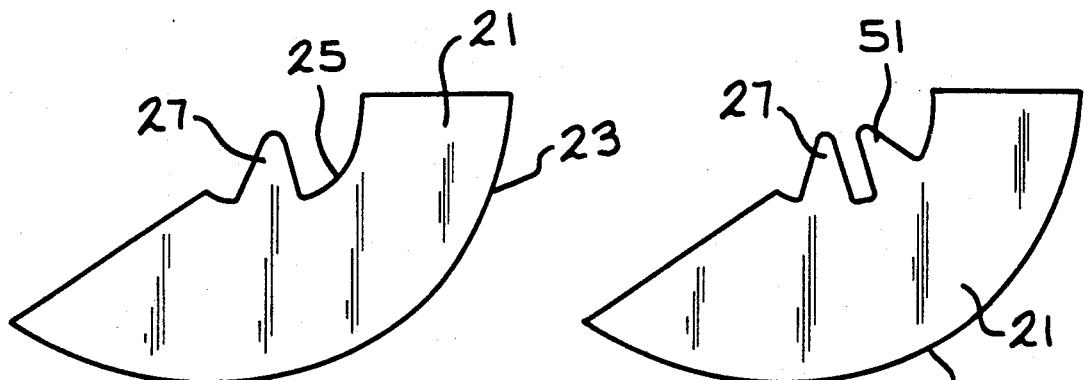
FIG. 2
FIG. 3
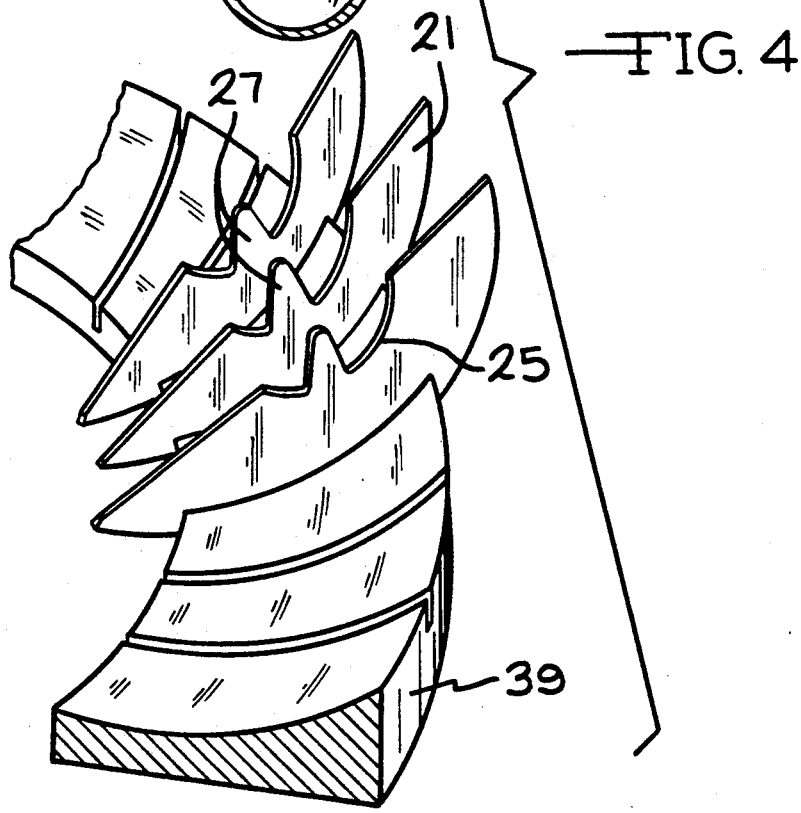
FIG. 4

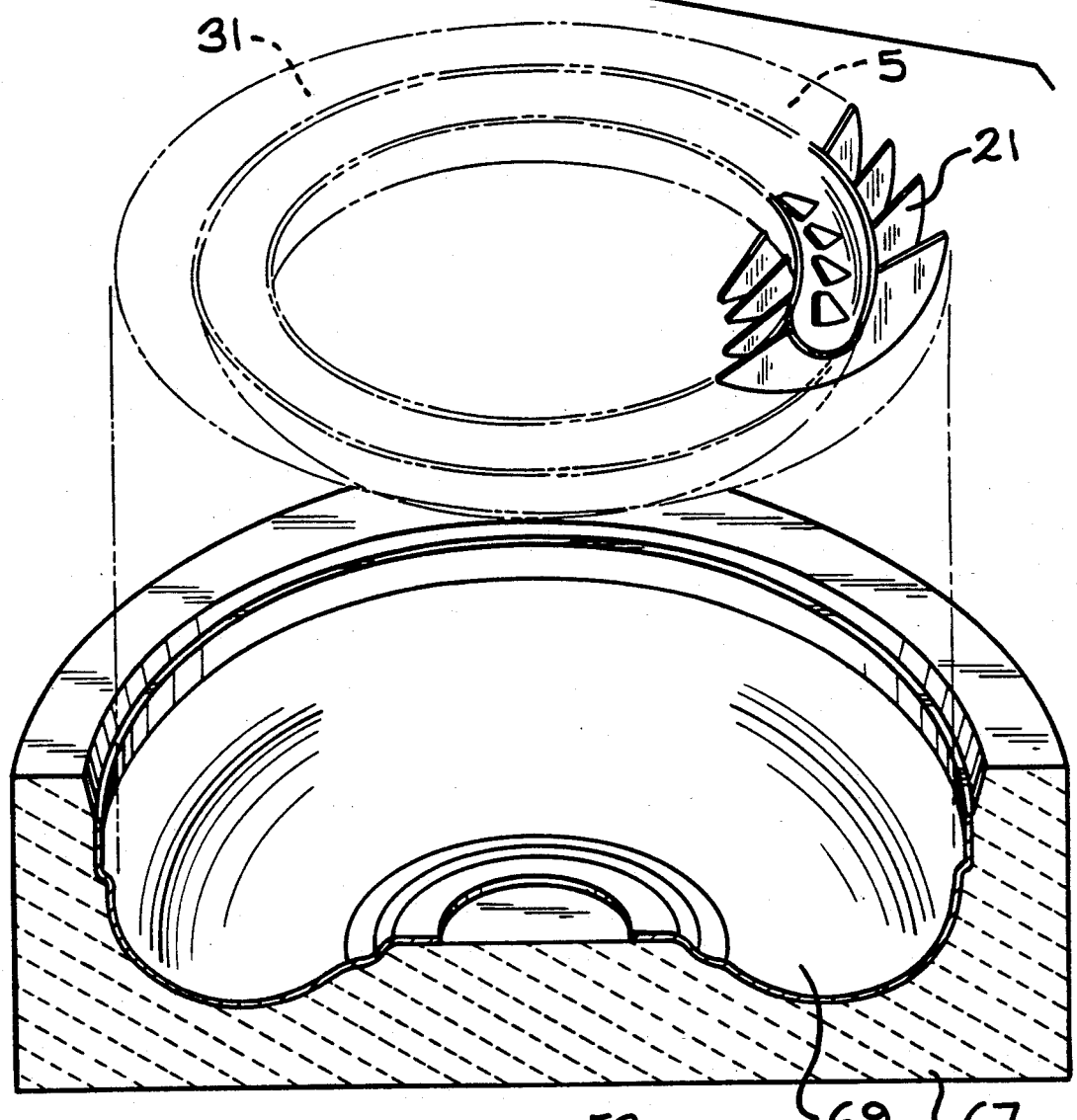
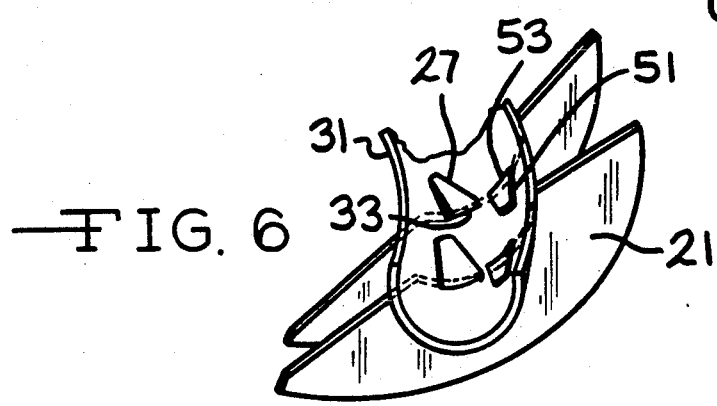

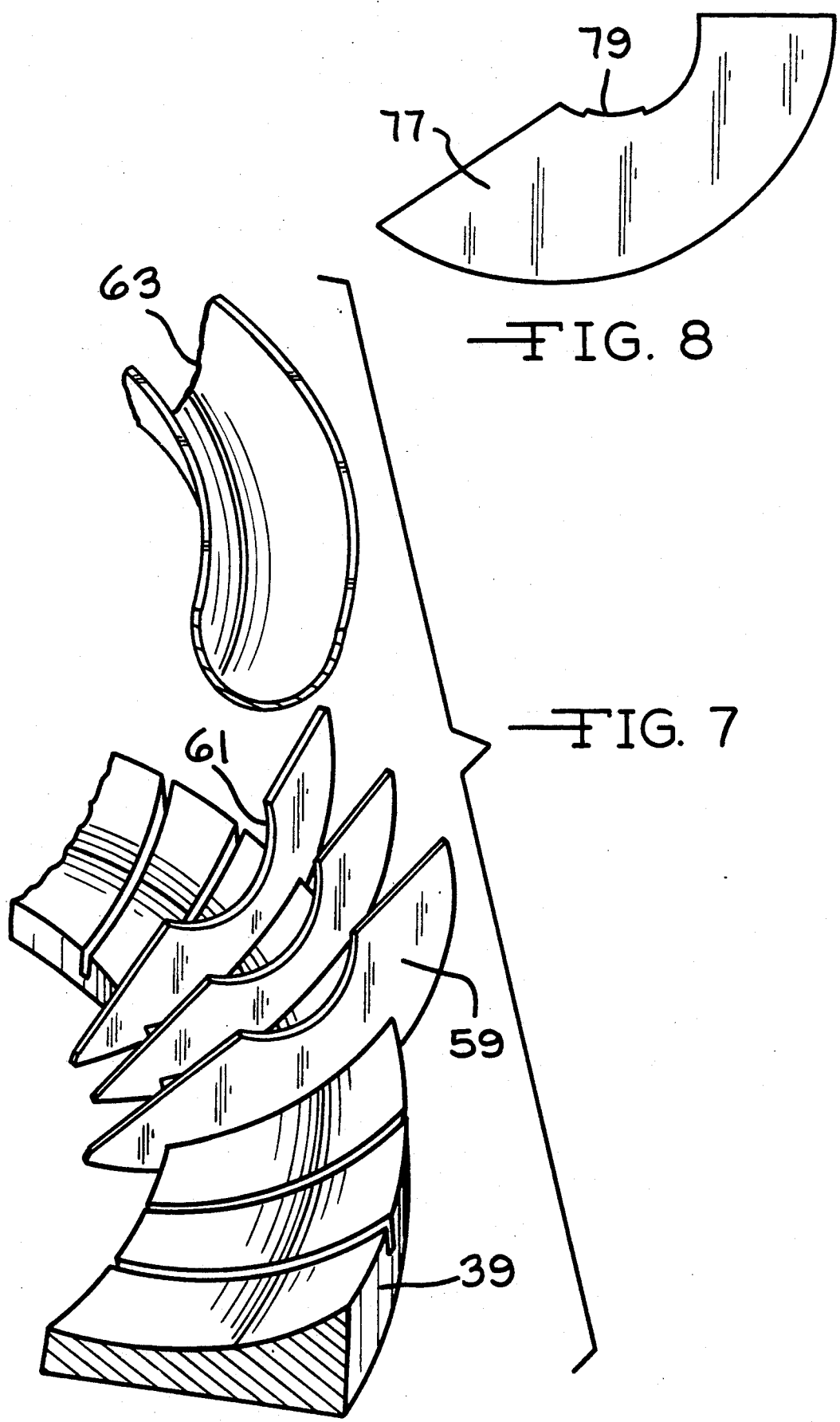

METHOD OF ASSEMBLING A TORQUE CONVERTER IMPELLER

TECHNICAL FIELD OF THE INVENTION

This invention relates to a torque converter impeller for use with an automatic transmission and a method for constructing such a torque converter impeller. More particularly, the invention relates to a torque converter impeller where it is no longer necessary to place indentations in the shell of the torque converter to position and align the blades of the impeller.

PRIOR ART

In prior art torque converter impellers there is an outer shell, a plurality of vanes or blades positioned in the outer shell and a core ring that is positioned on the blades. U.S. Pat. No. 3,545,883 to Iijima shows one example of such a prior art torque converter. To assist in assembling this type of prior art torque converter; inner, outer and intermediate indentations are positioned in the interior surface of the outer shell. The indentations are disposed to receive projections that extended from the vanes. When the vanes are positioned in the outer shell, the projections are matingly positioned in the indentations. This maintains the vanes in the proper orientation with respect to the outer shell of the torque converter. A tab also extended from a portion of the vanes and this tab is disposed to be in alignment with a slot in the core ring. When the core ring is positioned on the vanes the tab extends through the slot and the tab is then bent or rolled over to secure the core ring to the vanes.

The indentations required in the outer shell of the torque converter impeller are very difficult to form. The metal of the outer shell is relatively thick and it is necessary to utilize a machine generating a great deal of force to move the metal of the outer shell to form the indentations. This forming process is very slow and requires very expensive machinery to accomplish. In fact, the large indentations positioned on the outer periphery of the outer shell are basically formed one at a time by a very large and expensive metal processing machine. This type of a process is very expensive and also very slow.

A further complication is added when the vane shape is changed to suit different performance criteria. Changing the shape of the vanes requires that the position of the indentations be changed so that the vanes are maintained in a proper relationship with respect to the outer shell. In most instances, it is necessary to have separate machines to form each type of indentation that is required in the outer shell. These machines are very expensive and this greatly increases the processing cost for the torque converter impellers. This can also result in a significant underutilization of the machinery used to produce the indentations whenever there is not a high enough demand for a torque converter impeller with a particular vane orientation.

Assembling the torque converter impellers utilizing this prior art technology is also difficult as it is necessary to align the projections on the vanes with the indentations and to force the projections into the indentations to hold the vanes in the proper orientation during the assembly of the torque converter impeller. The indentations and projections have to fit together in a manner that would maintain the proper orientation for the vanes and also maintain the vanes in the outer shell of the torque converter impeller. Any defects in either the indentations in the outer shell or the projections on the vanes can greatly complicate the assembly process for this type of prior art torque converter impeller. The significance of this limitation can be understood when it is realized that the indentations and projections must fit together to maintain the vanes in their proper orientation until the vanes and outer shell are brazed together in a brazing oven.

SUMMARY OF THE INVENTION

The present invention secures the vanes to the core ring to maintain the vanes in their proper orientation. The vanes and core ring are then positioned in the outer shell and the components are secured together by a process such as brazing. With this method of construction there is no need to have indentations in the outer shell of the torque converter impeller and this overcomes the deficiencies previously discussed with regard to the prior art torque converter impellers.

BRIEF DESCRIPTION OF THE DRAWINGS

FIG. 2 is a side elevation view of a vane used in the torque converter impeller.

FIG. 3 is a side elevation view of another embodiment of a vane used in the present invention.

FIG. 4 is an exploded assembly view showing the construction of part of a torque converter impeller.

FIG. 5 is an assembly view for the torque converter impeller.

FIG. 6 is shows another embodiment of the vanes that can be used in the present invention.

FIG. 7 is an exploded assembly view showing the construction of a part of the invention.

FIG. 8 is a side elevation view of another embodiment of a vane used in the invention.

DESCRIPTION OF THE PREFERRED EMBODIMENT

This invention relates to a torque converter impeller for use with an automatic transmission and the method of constructing such a torque converter impeller. More particularly, this invention relates to a torque converter impeller where it is no longer necessary to place indentations in the outer shell of the torque converter to position and align the blade of the impeller. The features of the present invention will be more readily understood by referring to the attached drawings in connection with the following description.

Figure 1:
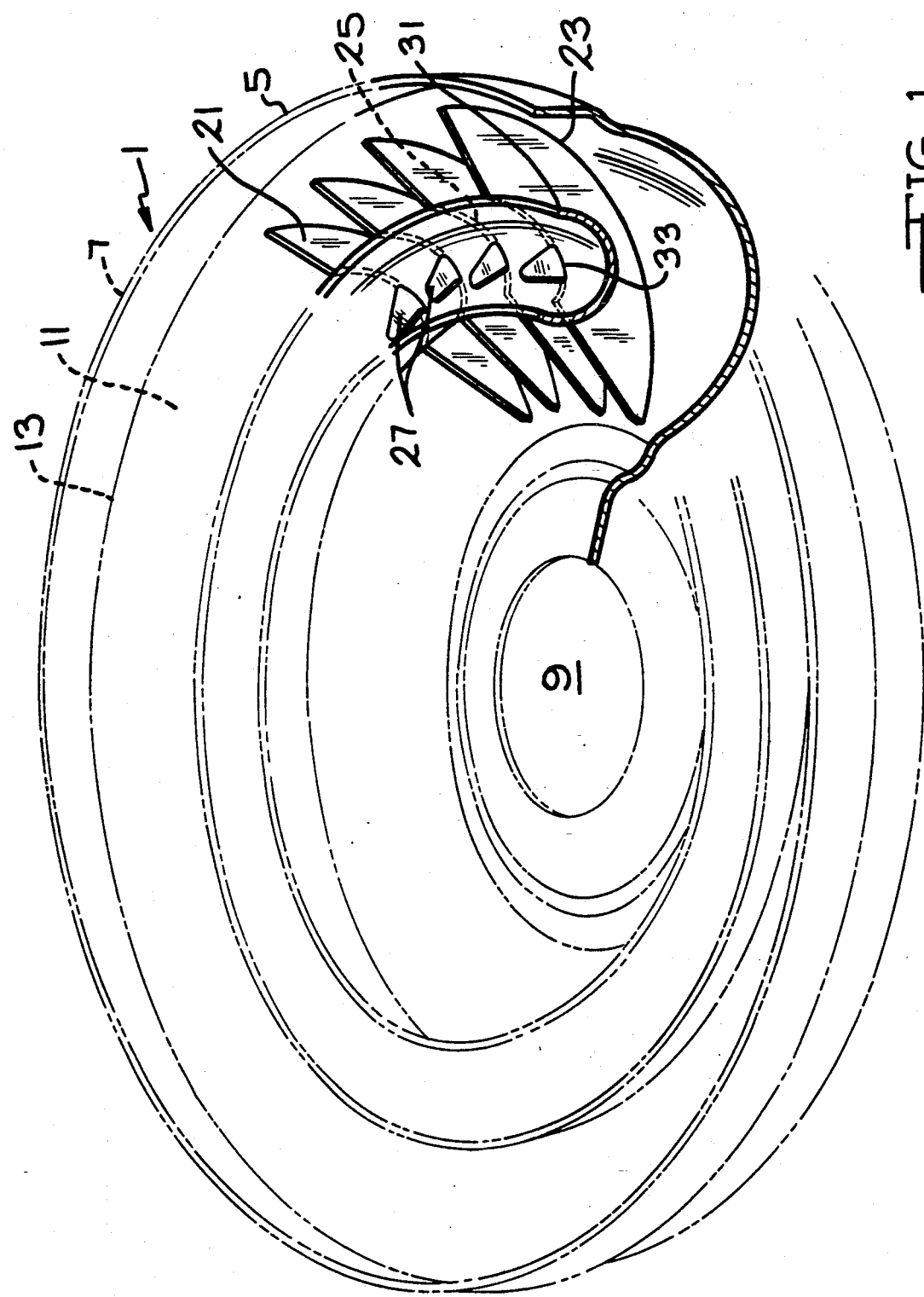
FIG. 1 is a perspective view of the torque converter impeller of the present invention.

As shown in FIGS. 1, 2 and 4, the torque converter impeller 1 has an annular outer shell 5 that is substantially semitoroidal in shape. The outer shell 5 defines an outer opening 7 and a center opening 9. The inner surface 11 of the outer shell 5 is substantially smooth and a shoulder 13 extends around the periphery of the outer shell 5.

A plurality of blades or vanes 21 are positioned in the interior of the outer shell 5. The vanes 21 have a substantially semicircular outer surface 23 that substantially conforms to the inner surface 11 of the outer shell 5. The side of the vanes 21 spaced apart from the outer surface 23 contain a notch 25. A tab 27 extends from the notch 25 in a direction away from the outer shell 5.

A substantially semitoroidal core ring 31 is positioned on the vanes 21. The core ring 31 has a plurality of slots 33 that are disposed to be in alignment with the tabs 27 on the vanes 21. When the core ring 31 is properly positioned on the vanes 21 the tabs 27 extend through the slots 33 in the core ring. The tabs 27 are bent or rolled over so that the tabs 27 are in contact with the surface of the core ring 31. The bent or rolled over tabs 27 act to secure the vanes 21 to the core ring 31.

The outer shell 5, vanes 21 and core ring 31 are normally made of sheet metal. The vanes 21 are used to pump fluid within a hydraulic torque converter of which the impeller is a component part. The impeller functions in a manner known in the art and a more complete description of a torque converter of this nature may be found in U.S. Pat. Nos. 2,717,673 and 2,855,852.

FIG. 4 shows the way in which the torque converter impeller 1 is assembled. The vanes 21 are positioned in a fixture 39 that holds the vanes in the desired orientation. The fixture 39 maintains the vanes in the correct angular and radial position so that the vanes will fit properly in the outer shell 5. When all of the vanes 21 are in position in the fixture 39 the core ring 31 is positioned on the notch 25 in the vanes 21. The tabs 27 in the vanes extend through the slots 33 and the core ring 31. The tabs 27 are then bent or rolled so that they rest against the surface of the core ring 31 that is opposite to the surface of the core ring that is in contact with the rest of the vanes 21. When the tabs 27 have been properly rolled or bent over the vanes 21 are secured to the core ring 31 in the proper orientation. The core ring 31 and vanes 21 are then removed as a single assembly from the fixture 39 and a brazing paste is positioned on the outer surface 23 of the vanes 21 and along the edges of the bent or rolled tabs 27. The subassembly of the core ring and vanes is then positioned in the outer shell 5. Since the vanes are disposed at the proper angular and radial orientation and maintained in this position by the core ring 31 the vanes are in the proper position with respect to the outer shell 5. To ensure that the vanes are in the proper position, a frame member (not shown) can be used to center the core ring 31 with respect to the outer shell 5. This further ensures that the vanes 21 and core ring 31 are properly positioned in the outer shell. The outer shell 5, vanes 21 and core ring 31 are then positioned in a brazing oven whereby the braze metal flows along the outer surface 23 of the vanes 21 and along the tabs 27 to securely bond the vanes to the outer shell 5 and to complete the bonding of the core ring 31 to the vanes 21.

In assembling the torque converter impeller 1 it is very significant that the vanes 21 can be positioned in the outer shell 5 without aligning the blades with specific indentations in the outer shell. This greatly facilitates the assembly of the torque converter impeller. It also removes the need to have the vanes produced in such a manner that they will properly align with indentations in the outer shell 5. This is a very significant advance because if there is any misalignment between the indentations in the outer shell 5 and the projections on the vanes it is very difficult to properly assemble the torque converter impeller. By doing away with these variables it is now much easier to produce the torque converter impellers. An additional feature that should also not be overlooked is the fact that since the outer shell no longer has indentations, it is no longer necessary to inventory outer shells by the orientation of the indentations in the outer shell. Also, it is no longer necessary to only use the type of vanes in an impeller that match the location of the indentations in the outer shell. Instead, the outer housings of the present invention can be used with a variety of vanes and it is easier to change from one vane configuration to a different vane configuration. It is also no longer necessary to make all of the indentations in the outer shell and this is also a significant time and cost saving in the manufacture of the torque converter impellers. The torque converter impeller of the present invention clearly eliminates all of these limitations of the prior torque converter impellers.

FIGS. 3 and 6 show another embodiment of the present invention. In this embodiment the components of the torque converter impeller are basically as previously described. However, in this embodiment a second tab 51 extends from the vanes 21. The second tabs are in alignment with a second series of slots 53 in the core ring 31. When the core ring is positioned on the vanes in the manner previously described, the second tabs 51 extends through the second series of slots 53. The second tabs 51 are bent or rolled over in the manner previously described so that the second tabs 51 are in contact with the surface of the core ring 31 that is opposite to the outer shell 5. The second tabs 51 and second slots 53 provide additional means to secure the vanes 21 to the core ring 31. The second tabs 51 also helps to ensure that the vanes 21 stay in the desired position when the core ring 31 and vanes 21 are positioned in the outer shell 5 in the manner previously described.

FIG. 8 shows another embodiment of a vane 77 that can be utilized in the present invention. The vane 77 is basically the same as the previously discussed vanes but it has a tab 79 that extends for a short distance from the vane 77. The tab 79 is disposed to engage the slots 33 in the core ring 31. However, the tab 79 does not extend through the slot 33 and is not bent over as the previously discussed tabs. The vanes 77 and core ring 31 are assembled in the manner previously described and the tabs 79 on the vanes 77 just extend into the slots 33. The tab 79 is secured to the core ring by brazing or welding to secure the vanes 77 to the core ring 31. If the vanes 77 are secured to the core ring 31 by brazing the vanes can be left in the fixture 39 while the vanes and core ring are positioned in a brazing oven to complete the brazing operation. This ensures that the vanes maintain the proper orientation until the blades are securely attached to the core ring. Once the vanes 77 are secured to the core ring 31 the core ring and vane subassembly is positioned in and secured to the outer shell 5 in the manner previously described.

FIG. 7 shows another embodiment of the present invention where vanes 59 are utilized that do not have any tabs. The vanes 59 have a notch 61 in which the core ring 63 is positioned. The core ring 63 does not have any slots since there are no tabs on the vanes 59. The vanes and core ring are assembled utilizing the fixture 39 in the manner previously described. However, the surface of the notch 61 is coated with a brazing material prior to positioning the core ring 63 on the vanes 59. Once the core ring is in the proper position, the vanes and core ring are positioned in a brazing furnace whereby the vanes and core ring are heated and the braze metal effectively secures the vanes 59 to the core ring 63. The vanes are retained in the fixture 39 during this brazing operation to maintain the vanes 59 in the proper orientation. The brazing operation effectively bonds the vanes 59 to the core ring 63 and ensures that the vanes will be maintained in the proper position when the vane and core ring assembly is positioned in the outer shell 5. It is also possible that the vanes 59 could be secured to the core ring 63 in other suitable ways such as welding. Once the vanes 59 have been secured to the core ring 63, the torque converter impeller is assembled in the same manner as previously described.

FIG. 5 shows a retaining fixture 67 that can be positioned around the outer periphery of the outer shell 5. The outer shell 5 is usually drawn from a strip of sheet metal. The sheet metal is usually in a coil and a portion of the metal is uncoiled and drawn into the shape of the outer shell 5. Sheet metal that comes from a long strip such as that used for the outer shell 5 frequently has a grain or orientation that can cause difficulties in later processing. It has been found that this grain can cause the outer shell to expand in a non-uniform manner when the shell is heated, such as in the brazing oven utilized to join the vanes 21 to the outer shell 5. If the shell expands in a non-uniform manner, the shell has a tendency to become more oval in shape and this can cause the shell to pull away from the outer surface 23 of the vanes 21. If the space between the outer surface 23 of the vanes 21 and the surface of the outer shell 5 becomes too great, the brazing paste will not flow along the joint between the vane 21 and the outer shell 5. When this happens the vanes are not securely attached to the outer shell 5 in the desired manner and the torque converter impeller assembly may be defective. To avoid the difficulties with the non-uniform expansion and contraction of the outer shell 5, retaining fixture 67 has been provided. The retaining fixture 67 has a recess 69 that substantially mates with the outer surface of the outer shell 5. The outer shell 5 is positioned in the recess 69 prior to positioning the torque converter impeller assembly in the brazing oven. The retaining fixture acts to retrict differential expansion and contraction of the outer shell 5 and to maintain the outer shell 5 in the desired configuration where the outer surfaces 23 of the vanes 20 are in contact with the inner surface of the outer shell 5. It has been found that using the retaining fixture 67 improves the uniformity of the outer shell 5 and also reduces defects in the joint between the vanes 21 and the outer shell 5. The retaining fixture 67 is preferably constructed of a material having a lower coefficient of expansion than the material of the outer shell 5. When the outer shell is sheet metal a ceramic material can be used for the retaining fixture 67. The retaining fixture 67 is used not to retain expansion, but to ensure that when the shell is heated that the shell expands to uniformly fill the circular opening provided by the retaining fixture 67.

Figure 9:
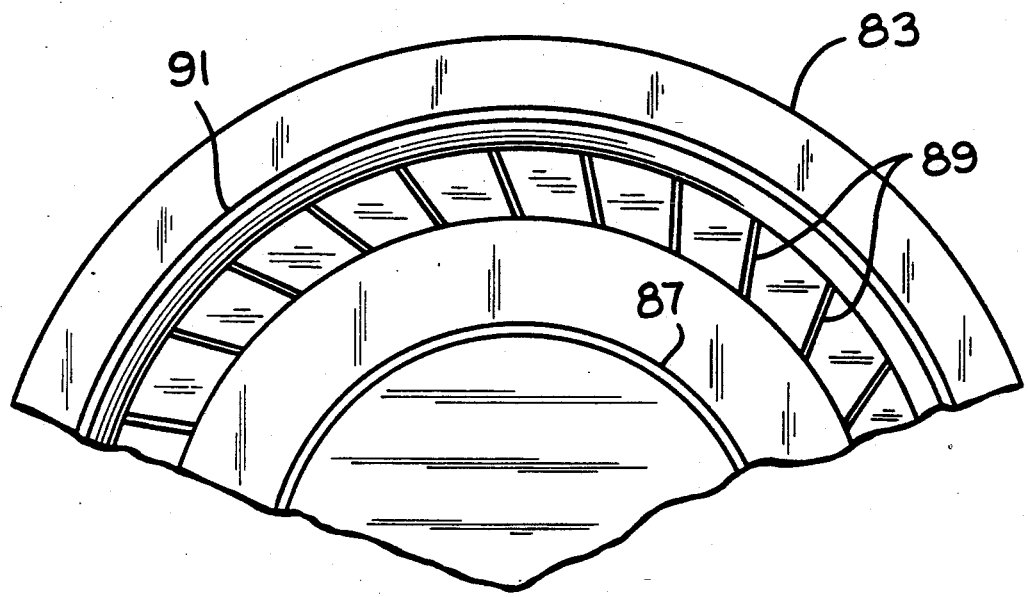
FIG. 9 is a partial plan view of another embodiment of the present invention.
Figure 10:
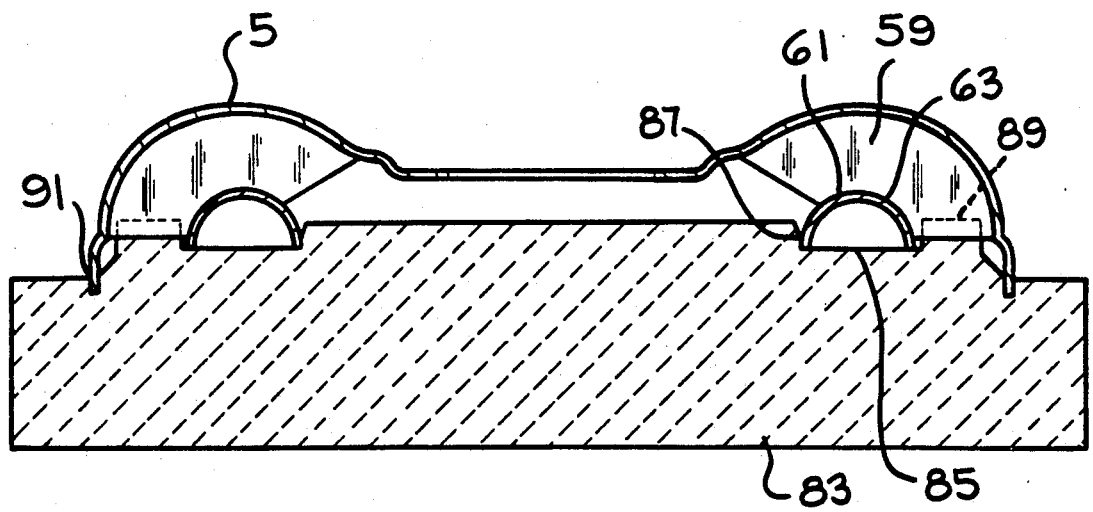
FIG. 10 is a cross-sectional view of the embodiment shown in FIG. 9.

FIG. 9 shows another embodiment of how the torque converter impeller of the present invention can be assembled. In this embodiment an assembly fixture 83 is utilized to assist in assembling the components of the torque converter impeller 1. The assembly fixture 83 has a shoulder 85 on which a core ring 63, such as that shown in FIG. 7 is positioned. A circular tab 87 can extend from the shoulder 85 in a direction towards the core ring 63. The circular tab 87 is disposed to maintain the core ring 63 in a desired location on the shoulder 85. To accomplish the desired centering for the core ring 63 the circular tab 87 will has a diameter that is just slightly smaller than the inner diameter of the core ring 63. Once the core ring 63 is in position, a plurality of vanes 59, such as shown in FIG. 7, are positioned around the core ring 63 in a manner where the notch 61 in the vanes 59 press against the outer surface of the core ring 63. The end of the vanes 59 that are displaced radially outwardly from the core ring 63 are positioned in a plurality of slots 89 located in the assembly fixture 83. The slots 89 are disposed to maintain the vanes 59 in a desired position with respect to the core ring 63 and the outer shell 5. It should be noted that a brazing paste is positioned along the notch 61 in the vanes 59 and also along the outer surface 57 of the vanes 59. Once the vanes 59 are in the proper position the outer shell 5 is positioned over the vanes so that the smooth interior surface of the outer shell is in contact with the outer surface 57 of the vanes 59. The assembly fixture 83 also has a channel 91 that is disposed for receiving the outer periphery of the outer shell 5.

Once the core ring 63, plurality of vanes 59 and outer shell 5 are properly positioned in the assembly fixture 83, the entire assembly can be positioned in a brazing furnace where the components are heated to cause the braze metal to flow along the joints between the components to secure the vanes 59 to the outer shell 5 and to the core ring 63. In this manner it is possible to secure together the components of the torque converter impeller without utilizing indentations in the outer shell to position and hold in place the various components of the torque converter impeller. Once the brazing operation has been completed, the assembly fixture 83 is removed from the impeller and reused in the assembly process. It would be necessary to have the slots 89 in the assembly fixture 83 disposed at the proper orientation to maintain the vanes in the desired position. It is much easier and quicker to assembly the components for the torque converter impeller utilizing the assembly fixture 83 than using the method of having a series of indentations in the outer shell as set forth in the prior art.

The channel 91 in the assembly fixture 83 also has the advantage that it acts to maintain the outer periphery of the outer shell 5 in the desired circular shape and restrains the outer periphery if there is differential expansion and contraction during the brazing process. In this manner, the channel 91 of the assembly fixture 83 acts much in the same way that the retaining fixture 67 as shown in FIG. 5 acts to maintain the desired shape for the outer shell 5.

In practice it has been found that the assembly fixture 83 can be made from a ceramic material or other suitable matierals that have a coefficient of expansion that is substantially the same as the coefficient of expansion utilized for the material of the components of the torque converter impeller. It should also be noted that the previously described vanes having tabs and the core ring having slots could be utilized in this embodiment of the present invention.

The above description is given for the sake of explanation. Various modifications and substitutions, other than those cited, can be made without departing from the scope of the following claims.

I claim:

1. A method for assembling a torque converter impeller comprising:
   positioning a plurality of vanes in a desired orientation, said vanes having a substantially uniform semicircular outer surface;
   positioning a core ring in contact with said vanes;

securing said vanes to said core ring to maintain said vanes in said desired orientation;

positioning said vanes and said core ring in an outer shell, said outer shell having a substantially smooth inner surface, said outer surface of said vanes substantially conforming to said inner surface of said outer shell, said core ring being solely responsible for maintaining said vanes at the desired orientation with respect to said outer shell when said vanes and core ring are positioned in said outer shell; and, securing said vanes and core ring to said outer shell.

2. The method of claim 1 in which said vanes are maintained in the desired orientation by removably positioning said fixture and securing said core ring to said vanes while said vanes are positioned in said fixture.

3. The method of claim 2 in which securing said core ring to said vanes is accomplished by brazing, said fixture holding said vanes in position with respect to said core ring until said vanes are secured to said core ring.

4. The method of claim 2 in which maintaining said vanes in the desired position is accomplished by vanes having at least one tab that extends from said vanes and a core ring having a plurality of slots, said slots being disposed to be in alignment with said tabs on said vanes, said tabs on said vanes extending into said slots to maintain said vanes in the desired orientation.

5. The method of claim 4 in which said vanes are positioned in said fixture while securing said vanes to said core ring.

6. The method of claim 4 in which securing said vanes to said core ring is accomplished by extending said tabs on said vanes through said slots in said core ring and bending said tabs over to secure said vanes to said core ring.

7. The method of claim 4 in which maintaining said vanes in the desired orientation is accomplished by extending two tabs that extend from said vanes into slots on said core ring that are in alignment with said tabs on said vanes.

8. The method of claim 7 in which securing said vanes to said core ring is accomplished by extending said two tabs on said vanes through said slots in said core ring and bending said tabs over to secure said vanes to said core ring.

9. The method of claim 1 in which securing said vanes to said core ring and said outer shell is accomplished by brazing.

10. The method of claim 9 in which maintaining said shape of said outer shell is accomplished by positioning said outer shell in a retaining fixture during said brazing to secure said vanes to said outer shell and said core ring.

11. A method for assembling a torque converter impeller comprising:

positioning a plurality of vanes in a desired configuration, said vanes having a substantially uniform semicircular outer surface and at least one tab projecting from said vanes;

positioning a core ring on said vanes, said core ring having a plurality of slots, said slots being in alignment with said tabs on said vanes, said tabs extending into said slots;

securing said tabs that extend into slots to said core ring, said tabs securing said vanes to said core ring to maintain said vanes in the desired configuration;

positioning said vanes and said core ring in an outer shell said outer shell having a substantially smooth inner surface, said outer surface of said vanes substantially conforming to said inner surface of said outer shell; and, securing said vanes and core ring to said outer shell, said tabs and core ring being solely responsible for maintaining said vanes at the desired orientation when said vanes and core ring are positioned in said outer shell.

12. The method of claim 11 in which said vanes are maintained in the desired orientation by removably positioning said vanes in a fixture and securing said core ring to said vanes while said vanes are positioned in said fixture.

13. The method of claim 12 in which securing said vanes to said core ring is accomplished by brazing.

14. The method of claim 12 in which securing said vanes to said core ring is accomplished by said tabs on said vanes through said slots in said core ring and bending said tabs over to secure said vanes to said core ring.

15. The method of claim 11 is which securing said vanes and core ring to said outer shell is accomplished by brazing.

16. The method of claim 15 in which maintaining said shape of said outer shell is accomplished by positioning said outer shell in a retaining fixture during said brazing to secure said vanes and core ring to said outer shell.

17. A method for assembling a torque converter impeller comprising:

positioning a plurality of vanes in a fixture to maintain said vanes in a desired orientation;

positioning a core ring on said vanes;

securing said core ring to said vanes while said vanes are still positioned in said fixture to maintain said vanes at the desired orientation, said vanes and core ring forming a subassembly;

removing said subassembly of said vanes and said core ring from said fixture;

positioning said subassembly in an outer shell;

positioning said outer shell in a retaining fixture to maintain said shape of said outer shell; and positioning said outer shell in said retaining fixture and said subassembly in a brazing oven to braze said subassembly to said outer shell, said retaining fixture maintaining said shape of said outer shell during said brazing.

18. A method for assembling a torque converter impeller comprising:

positioning a core ring for said impeller on a fixture, said fixture maintaining said core ring in a desired orientation;

positioning a plurality of vanes in said fixture where said vanes are maintained in a desired position said vanes having a substantially uniform semicircular outer surface, a portion of said vanes being in contact with said core ring;

positioning an outer shell on said vanes, said outer shell having a substantially smooth inner surface, said outer surface of said vanes substantially conforming to said inner surface of said outer shell, said inner surface of said shell being in contact with said outer surface of said vanes;

securing said vanes to said core ring and said outer shell; and removing said fixture from said torque converter impeller.

19. The method of claim 18 in which maintaining said vanes in a desired position is accomplished by removably positioning said vanes in a plurality of slots located in said fixture, said slots maintaining said vanes in a desired position with respect to said core ring and said outer shell.

20. The method of claim 18 in which securing said vanes to said outer shell and said core ring is accomplished by brazing.

21. The method of claim 20, in which maintaining the shape of the outer shell is accomplished by a fixture having a channel for receiving the outer periphery of said outer shell, said channel acting to maintain the shape of said outer shell during said brazing.

* * * * *